US008908045B2

(12) United States Patent  
Stewart

(10) Patent No.: US 8,908,045 B2
(45) Date of Patent: Dec. 9, 2014

(54) CAMERA DEVICE TO CAPTURE AND GENERATE TARGET LEAD AND SHOOTING TECHNIQUE DATA AND IMAGES

(76) Inventor: David Alexander Stewart, Boca Raton, FL (US)

(*) Notice: Subject to any disclaimer, the term of this patent is extended or adjusted under 35 U.S.C. 154(b) by 336 days.

(21) Appl. No.: 13/420,844

(22) Filed: Mar. 15, 2012

(65) Prior Publication Data

US 2013/0169820 A1 Jul. 4, 2013

Related U.S. Application Data

(60) Provisional application No. 61/453,014, filed on Mar. 15, 2011, provisional application No. 61/582,545, filed on Jan. 3, 2012.

(51) Int. Cl.
*H04N 5/225* (2006.01)
*F41G 1/473* (2006.01)
*H04N 5/232* (2006.01)

(52) U.S. Cl.
CPC ............ *H04N 5/225* (2013.01); *F41G 1/473* (2013.01); *H04N 5/232* (2013.01)
USPC ....................................... 348/169

(58) Field of Classification Search
USPC ....................................... 348/169
See application file for complete search history.

(56) References Cited

U.S. PATENT DOCUMENTS

| | | | | |
|---|---|---|---|---|
| 5,845,165 | A * | 12/1998 | McMahan | 396/426 |
| 6,070,355 | A * | 6/2000 | Day | 42/106 |
| 6,385,894 | B1 * | 5/2002 | Podvin | 42/146 |
| 6,425,697 | B1 * | 7/2002 | Potts et al. | 396/426 |
| 6,792,206 | B2 * | 9/2004 | Gordon | 396/263 |
| 7,162,806 | B1 * | 1/2007 | Swiggart | 33/265 |
| 7,559,169 | B2 * | 7/2009 | Hung et al. | 42/119 |
| 7,780,363 | B1 * | 8/2010 | Holmberg | 396/426 |
| 8,069,605 | B2 * | 12/2011 | Fressola et al. | 42/90 |
| 8,093,992 | B2 * | 1/2012 | Jancic et al. | 340/12.5 |
| 2004/0031184 | A1 * | 2/2004 | Hope | 42/111 |
| 2004/0198336 | A1 * | 10/2004 | Jancic et al. | 455/420 |
| 2005/0213962 | A1 * | 9/2005 | Gordon | 396/502 |
| 2006/0082730 | A1 * | 4/2006 | Franks | 352/95 |
| 2006/0201046 | A1 * | 9/2006 | Gordon | 42/119 |
| 2007/0044365 | A1 * | 3/2007 | Deken | 42/146 |
| 2007/0051235 | A1 * | 3/2007 | Hawkes et al. | 89/37.04 |
| 2007/0147828 | A1 * | 6/2007 | Nelson | 396/426 |
| 2007/0209268 | A1 * | 9/2007 | Birurakis et al. | 42/119 |

(Continued)

*Primary Examiner* — Dave Czekaj
*Assistant Examiner* — Leron Beck
(74) *Attorney, Agent, or Firm* — Fleit Gibbons Gutman Bongini & Bianco PL; Jon A. Gibbons

(57) ABSTRACT

A novel system and process is described for the capturing of the images of a target, and/or the shooter, at the time around the discharge of a gun, bow, or shooting device and the display of the images prior to discharge, around point of discharge, and post discharge in a manner that allows the shooter to analyze the images and data. More particularly, the process is directed to shooting a moving target that must be led in order that the projectile (or projectiles) arrives on target after the point in time where the shoot decision is made and the projectile reaches the target area. This process aids the shooter by letting them see images and sight pictures of successful and unsuccessful shots and how much lead, if any, they had given the targets at the point in time they decided to shoot. It also allows for the shooters technique to be recorded and analyzed.

20 Claims, 12 Drawing Sheets

(56) References Cited

U.S. PATENT DOCUMENTS

| | | |
|---|---|---|
| 2008/0060248 A1* | 3/2008 | Pine et al. ............... 42/114 |
| 2008/0107414 A1* | 5/2008 | Showalter ............... 396/429 |
| 2008/0112698 A1* | 5/2008 | Ray ............... 396/56 |
| 2009/0252486 A1* | 10/2009 | Ross et al. ............... 396/419 |
| 2010/0313461 A1* | 12/2010 | Holmberg ............... 42/90 |
| 2012/0126002 A1* | 5/2012 | Rudich ............... 235/404 |
| 2012/0167437 A1* | 7/2012 | Holmberg ............... 42/90 |
| 2012/0180367 A1* | 7/2012 | Singh ............... 42/117 |
| 2012/0270186 A1* | 10/2012 | Singh ............... 434/19 |
| 2013/0111798 A2* | 5/2013 | Russell ............... 42/90 |
| 2014/0059911 A1* | 3/2014 | Oh et al. ............... 42/16 |

* cited by examiner

Figure 1

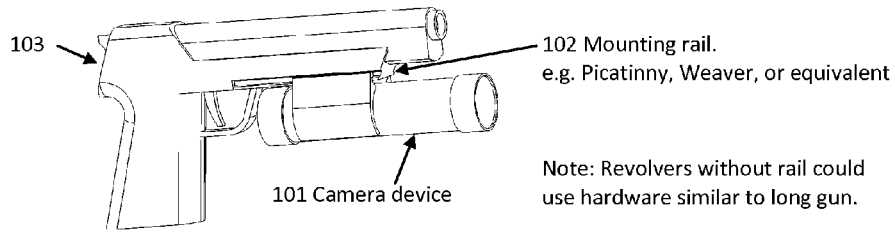

103 → [pistol]
102 Mounting rail.
e.g. Picatinny, Weaver, or equivalent

101 Camera device

Note: Revolvers without rail could use hardware similar to long gun.

Long Gun
105

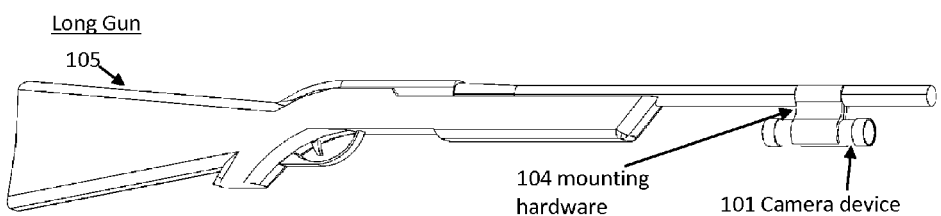

104 mounting hardware
101 Camera device

Optional positions include left or right of barrel, front (lens) facing towards target, or facing back towards shooter.
Also, some long guns have mounting rails which are suitable.

Bow

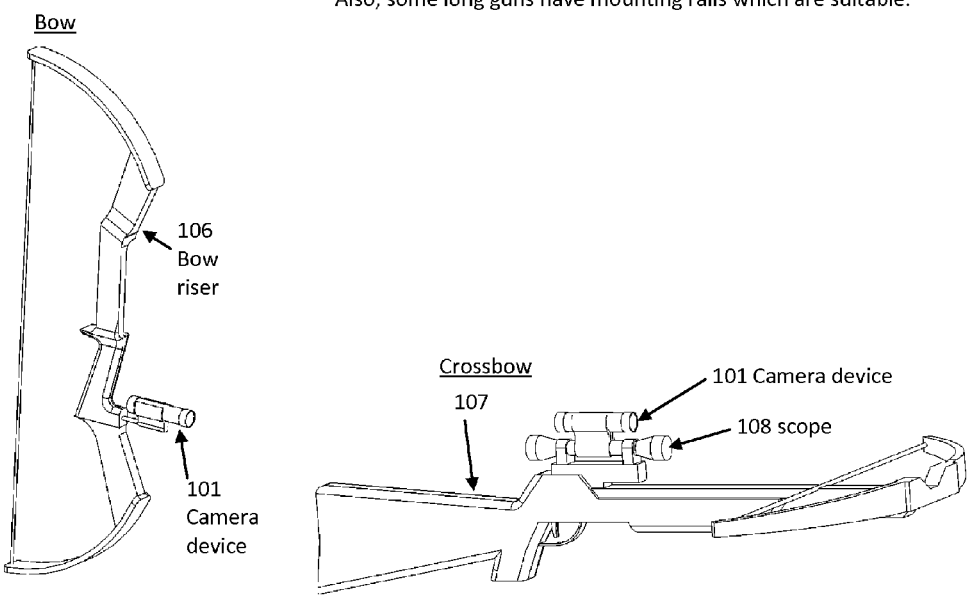

106 Bow riser

101 Camera device

Crossbow
107

101 Camera device
108 scope

Long gun and crossbow can have camera device 101 mounted alongside scope or under crossbow or barrel.

Figure 2
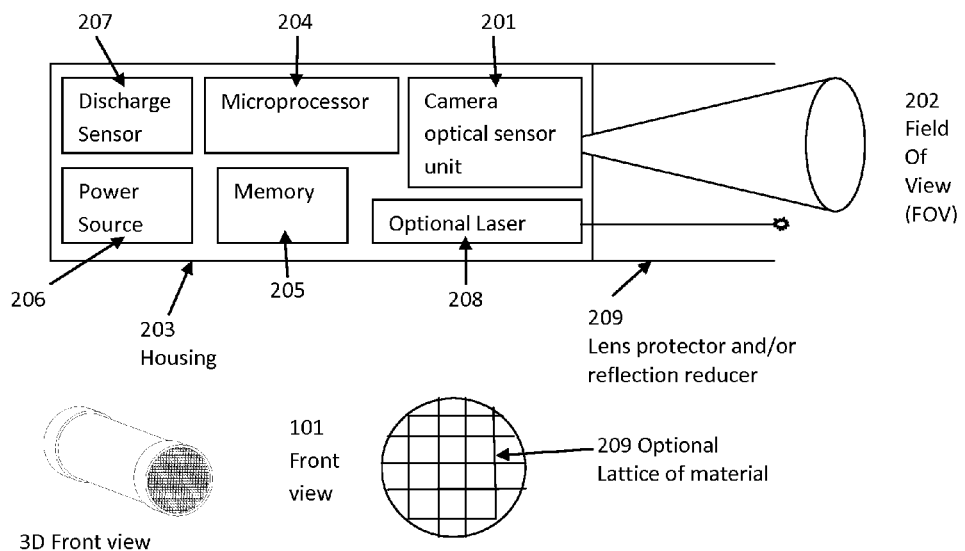
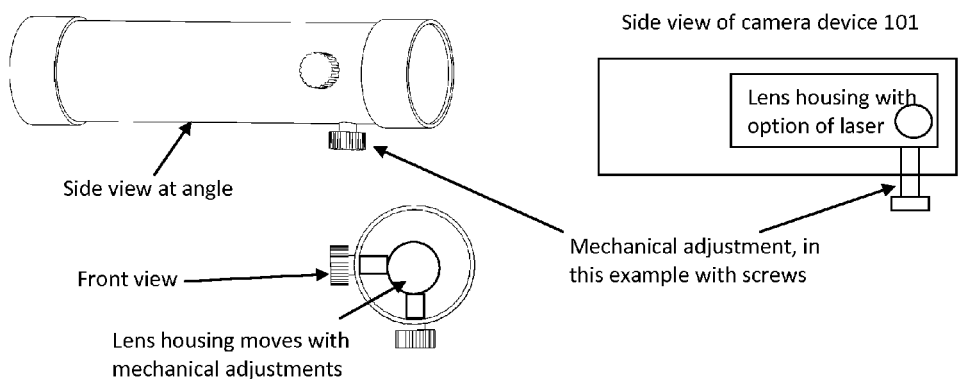
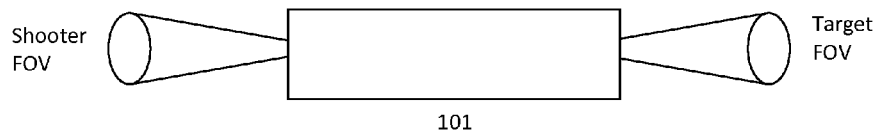

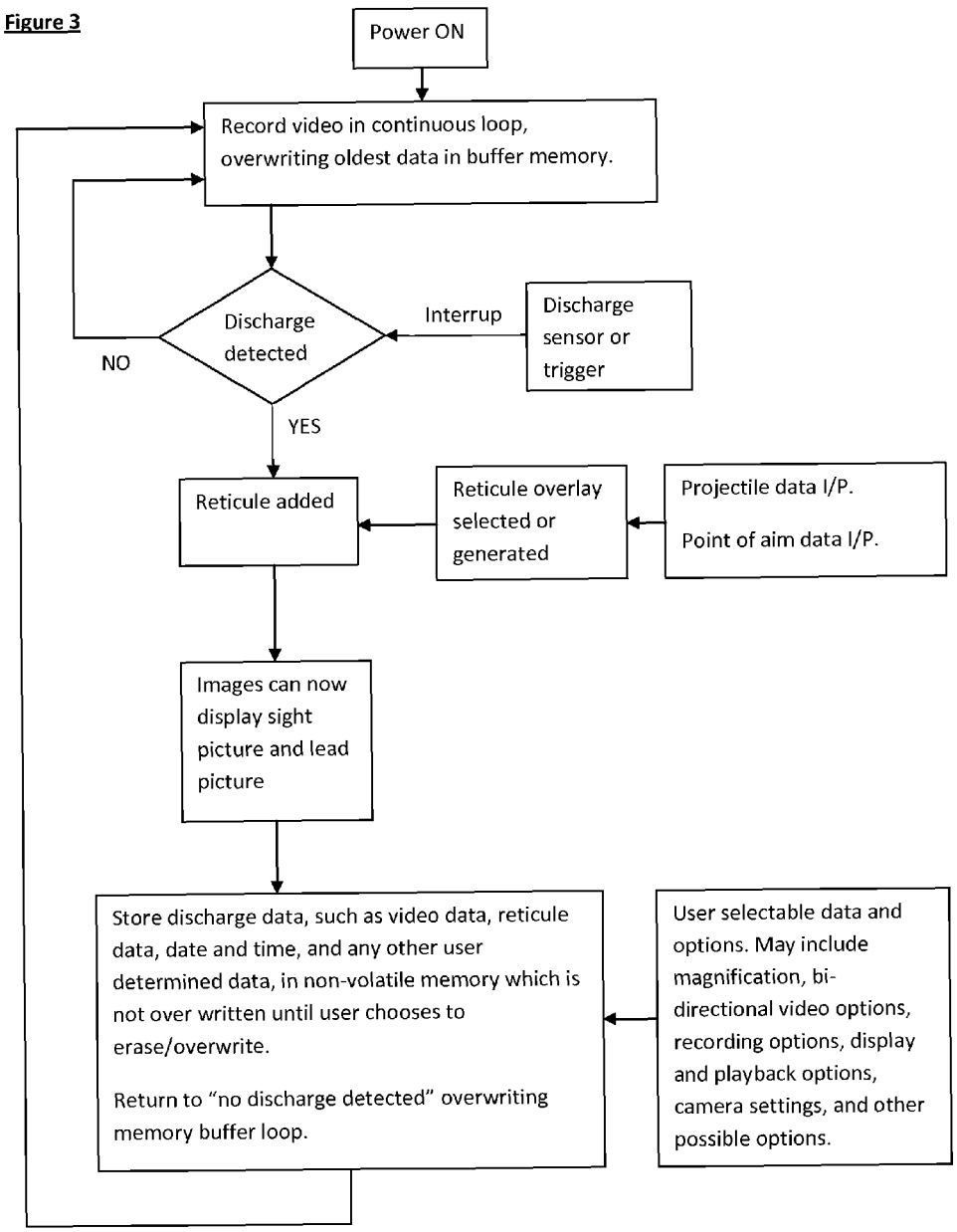

Figure 4

Playback Examples

First playback run shows continuous video

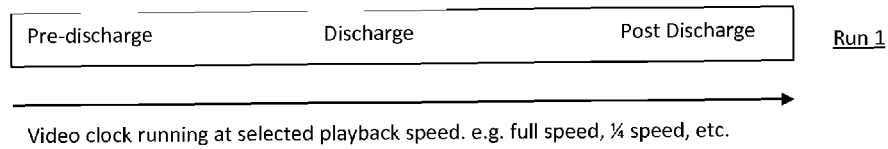

Video clock running at selected playback speed. e.g. full speed, ¼ speed, etc.

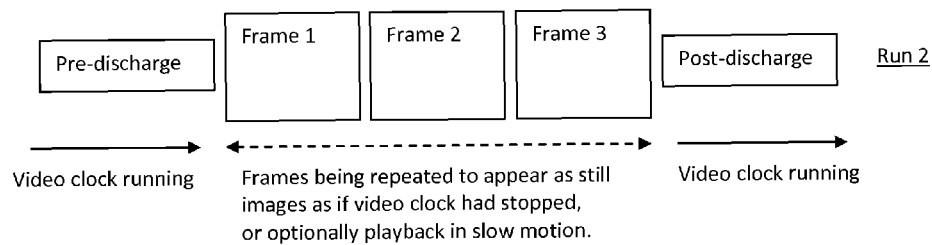

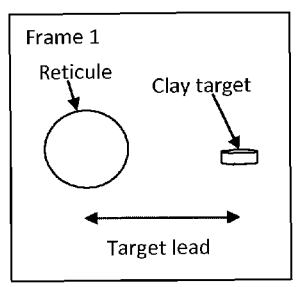
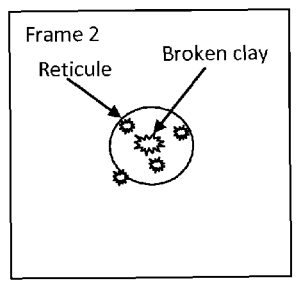
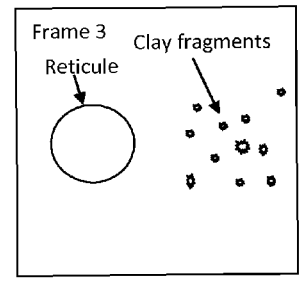

Frame 1 depicts "decision to shoot time", also called sight picture.

Frame 2 depicts image after selectable time for projectiles to arrive at target, 20 yards in this example. This represents the impact picture.

Frame 3 depicts image after selectable time for projectiles to pass target, 60 yards in this example. This represents the follow-through picture.

Figure 5

Two of many possible shapes and options for reticules | Application examples of what reticule represents ○ | + Shotgun – Full Choke 2'6" at 40 yards ○ | + Shotgun – Modified Choke 3'6" at 40 yards ○ | + Shotgun – Improved Cylinder 4'6" at 40 yards () | + Application such as Bow or Crossbow with elongated reticule to represent rapid vertical drop of arrow. In this example representing 8" x 24" at 30 yards.

⬭ | + Application with large windage factor i.e. horizontal error.

○ | + High velocity rifle representing 3" at 200 yards.

○ | + Low velocity rifle representing 3" at 100 yards.

○ | + High velocity handgun representing 3" at 20

○ | + Low velocity handgun representing 6" at 20

Some examples of other possible reticules

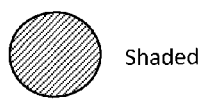 Shaded     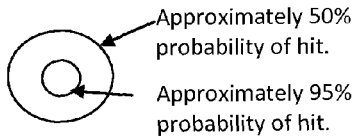 Approximately 50% probability of hit. Approximately 95% probability of hit.     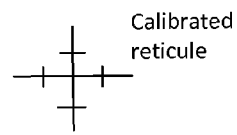 Calibrated reticule In the examples above if the point of aim reticule is used it requires the barrel be clamped, held steady, or somehow fixed, to allow the video to be played on a display to confirm matching point of aim.

The integrated laser option (bottom sketch), or integrated display option (not shown), built in to the camera eliminates the need for fixing the barrel position.

Optional Features

Figure 8

Some examples of mounting hardware.

Single barrel strap mount

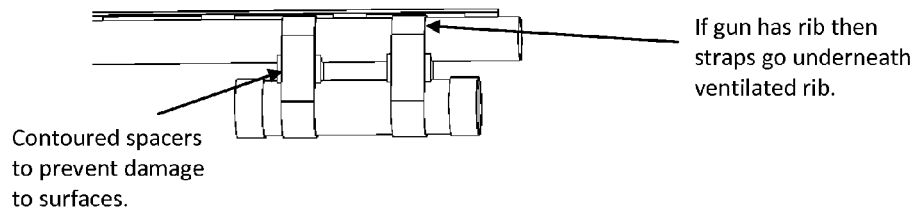

If gun has rib then straps go underneath ventilated rib.

Contoured spacers to prevent damage to surfaces.

Double barrel over/under strap mount

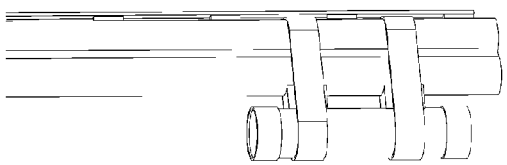

Clamps for single barrel, or O/U barrels rifle or shotgun.

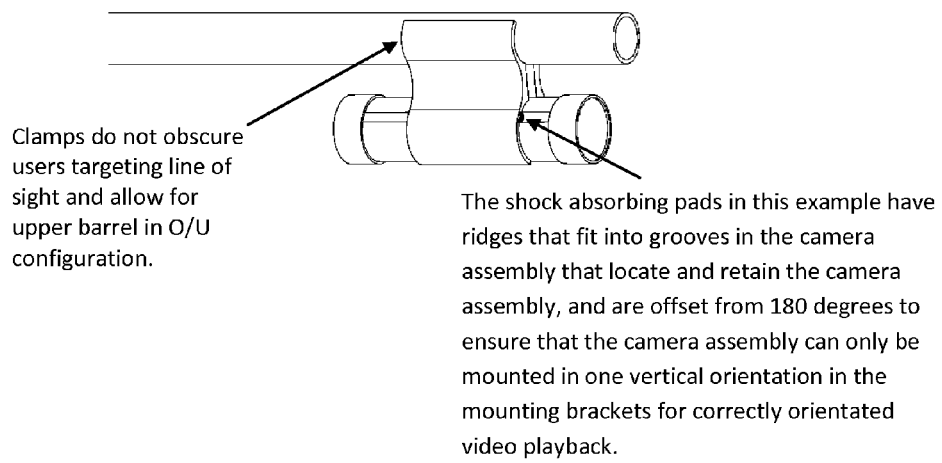

Clamps do not obscure users targeting line of sight and allow for upper barrel in O/U configuration.

The shock absorbing pads in this example have ridges that fit into grooves in the camera assembly that locate and retain the camera assembly, and are offset from 180 degrees to ensure that the camera assembly can only be mounted in one vertical orientation in the mounting brackets for correctly orientated video playback.

Clamps for double barrel side-by-side rifle or shotgun.

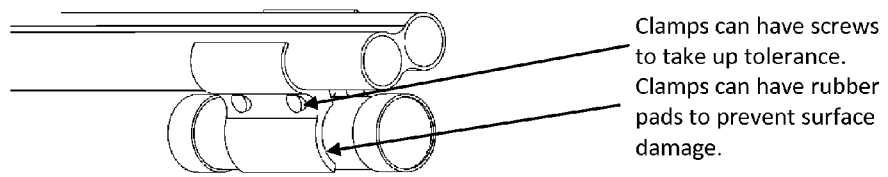

Clamps can have screws to take up tolerance. Clamps can have rubber pads to prevent surface damage.

Figure 9
Examples of point of aim calibration
Laser calibration
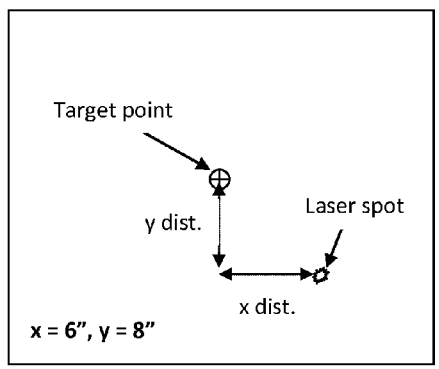
x = 6", y = 8"
Graticule calibration
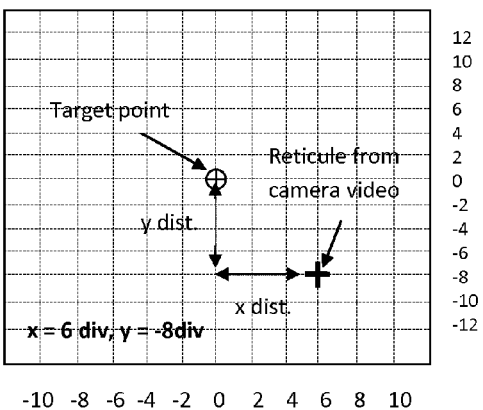
x = 6 div, y = -8div
Example Of User Interface
Distance to target point in yards  [ 10 ]
Measured offset in x direction (can be in inches or graticule divisions)    Left [   ]  ⊕  Right [ 6 ]
Measured offset in y direction (can be in inches or graticule divisions)    High [   ]  ⊕  Low [ 8 ]

Figure 10

Pictorial example of memory management

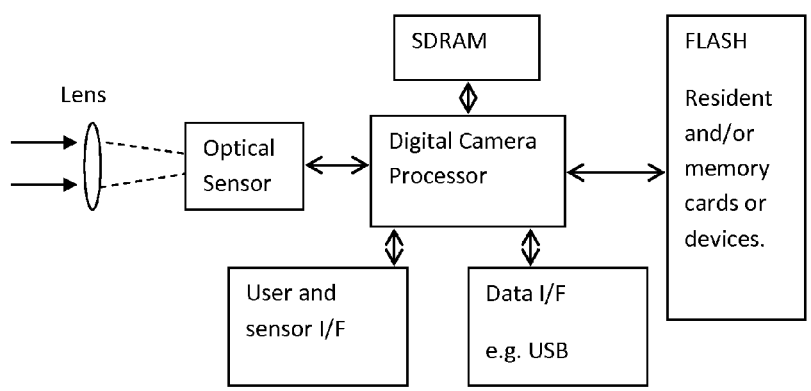

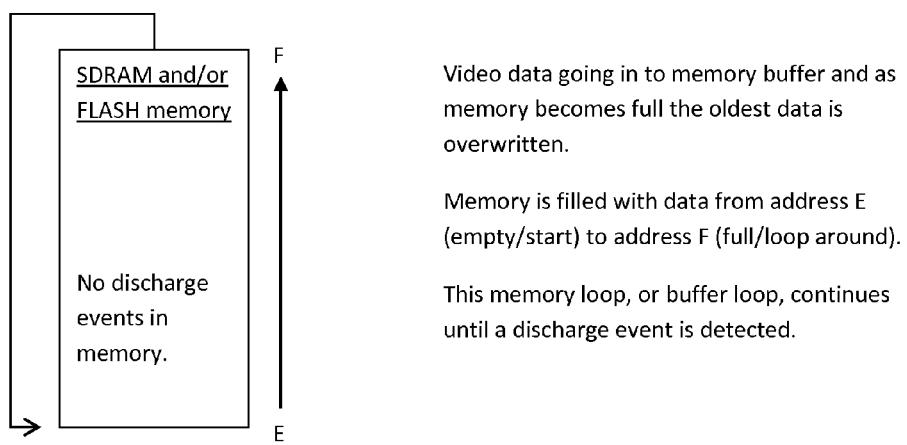

Video data going in to memory buffer and as memory becomes full the oldest data is overwritten.

Memory is filled with data from address E (empty/start) to address F (full/loop around).

This memory loop, or buffer loop, continues until a discharge event is detected.

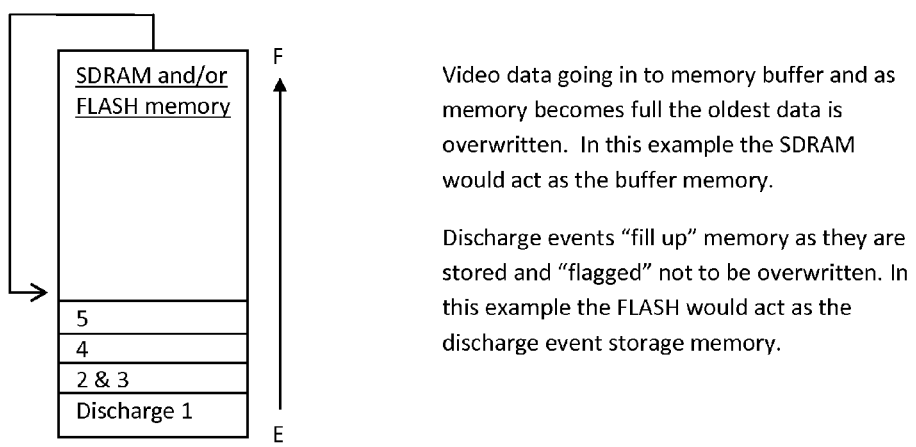

Video data going in to memory buffer and as memory becomes full the oldest data is overwritten. In this example the SDRAM would act as the buffer memory.

Discharge events "fill up" memory as they are stored and "flagged" not to be overwritten. In this example the FLASH would act as the discharge event storage memory.

Figure 11

Sketches of tests done at Markham Park skeet range on March 10th 2011.

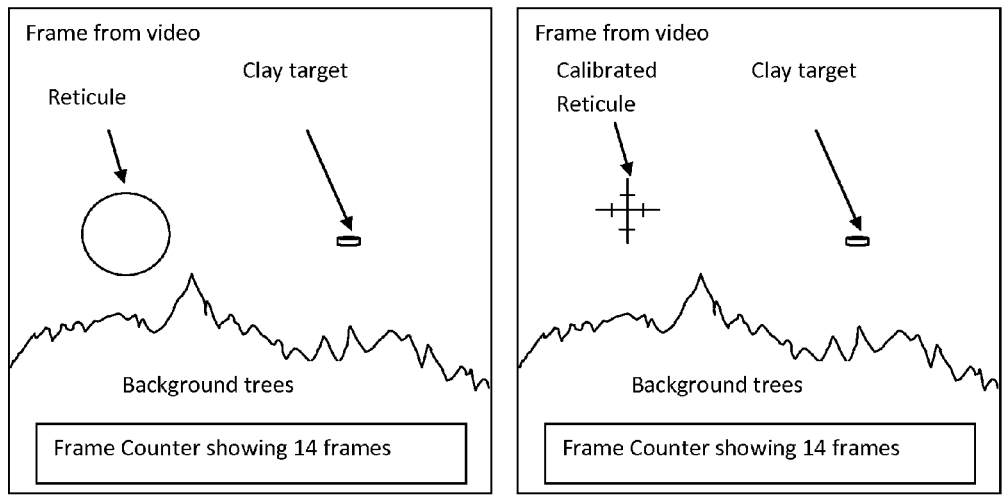

The time before impact frame of this sight picture was equivalent to 14 frames of video.
The frame rate was every 33ms. The video was slowed down to 15% of full speed.

Therefore the time before impact was calculated as:

(14-1) x 33ms x 0.15 = 64ms

The distance the projectiles (1200 fps) traveled to the target was calculated as:

1200 fps x 64ms = 77ft or equivalent to the approximate 25 yard distance that was observed.

Figure 12

Multiple reticules to indicate point of aim and path of projectile

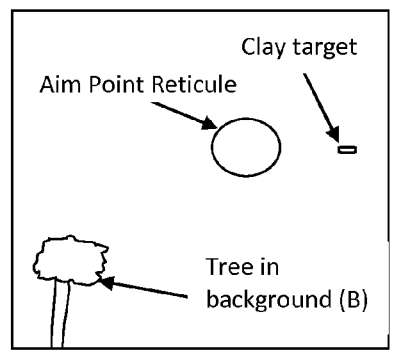

Time is 30ms before shot discharge time.
t= SD (Shot Discharge) – 30ms

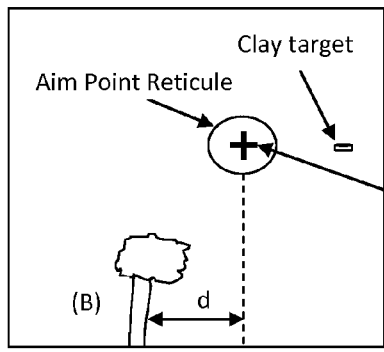

Aim point reticule and clay target have moved toward the background tree (B).
Time is shot discharge time.
t=SD Path of projectile reticule and/or indicator added at shot discharge time.
Relative horizontal position of path of projectile reticule is d and will remain constant.

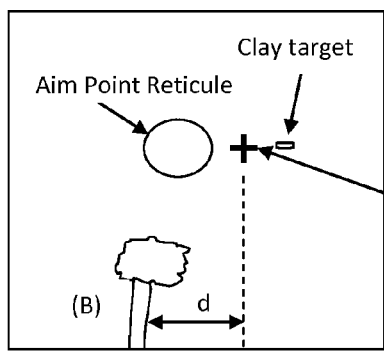

Aim point reticule and clay target have moved further toward the background tree (B).
Time is shot discharge time plus 30ms.
t=SD + 30ms Path of projectile reticule and/or indicator stays at same point relative to background.

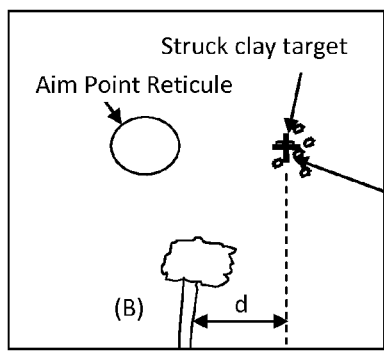

Aim point reticule and clay target keep moving to left.
Time is shot discharge time plus 60ms.
t=SD + 60ms Path of projectile reticule and/or indicator stays at same point relative to background.
The clay is struck and broken at point in space represented by path of projectile reticule.
In this example it takes 60ms from discharge time for the projectiles to hit the target.

CAMERA DEVICE TO CAPTURE AND GENERATE TARGET LEAD AND SHOOTING TECHNIQUE DATA AND IMAGES

CROSS-REFERENCE TO RELATED APPLICATIONS

This application is based upon and claims priority to, U.S. Provisional Patent Application Ser. No. 61/453,014 filed Mar. 15, 2011, entitled "CAMERA DEVICE TO CAPTURE AND GENERATE TARGET LEAD AND SHOOTING TECHNIQUE DATA AND IMAGES", and U.S. Provisional Patent Application Ser. No. 61/582,545 filed Jan. 3, 2012, entitled "GUN CAMERA MOUNTING AND PROGRAMMING SYSTEMS", the disclosures of which are hereby incorporated by reference in their entirety.

FIELD OF THE INVENTION

This invention relates to processes for the capturing of the sight picture and images of a target, and/or the shooter, at the time around the discharge of a gun, bow, or shooting device and the display of the images prior to discharge, around point of discharge, and post discharge in a manner that allows the shooter to analyze the images and data. More particularly, the present invention relates to the process in shooting where a moving target must be led in order that the projectile (or projectiles) arrives on target after the point in time where the shoot decision is made and the projectile reaches the target area.

BACKGROUND OF THE INVENTION

When shooting at a moving target the distance in front of the target that the shooter must aim to successfully hit the target is referred to as the lead distance, and commonly abbreviated to lead. The shooting community has long understood the necessity to lead moving targets. However, both experienced and novice shooters can have problems establishing the correct amount of lead for a given target.

There are several traditional civilian methods for recording both video and still images of targets being shot at. In most typical processes, a video camera is approximately directed at the shooting device point of aim and video is captured for later playback, but no lead picture is generated and no point of aim reticule is displayed.

In some cases video has been taken directly, or via a prism, through the rifle scope but this invention records video and images independently from a scope mounted on the shooting device.

This invention has specific application in the hunting, target shooting, and law enforcement fields. However, it can be utilized in any field where it is helpful to capture the sight picture of the user at key points in time as it relates to targeting an object. The primary example used in the figures and description will be the case in which a shotgun is being used to shoot at clay targets at a suitable target range facility.

In the clay target and shotgun case the two most common methods of giving a target the appropriate amount of lead are the swing through method, and the sustained lead method.

In the swing through method, the shooter starts with the gun sight behind the target and moves (swings) the gun barrel sight up behind the target and then past the target and shoots at the point they intuitively feel matches their experience of what lead to give. The gun aim point is swinging faster than the target and provided the gun has accelerated "past" the target and is kept swinging the aim point at gun discharge will actually be leading the target more than the shooter perceived, as the time between the decision to shoot and the gun discharge results in an increased lead.

In the sustained lead method a shooter establishes a lead based on their experience and then will match the swing of the gun to the target speed while sustaining the predetermined lead. If for example the shooter believes he should lead a target by 3 feet then he will attempt to have the aim point of the gun stay 3 feet in front of the target while matching the swing of the barrel to the speed of the target.

It is beneficial in both these methods that the gun be kept swinging as the gun discharges.

Common shooting technique errors such as errors from shooting device mounting, improper position, lifting of the head, improper balance, improper aiming, and more complex problems such as learning to lead the target correctly, have traditionally required a lot of time and practice with live firing.

Many of these errors, including correctly leading a target, are more efficiently identified and resolved with the visual aids and feedback provided by this invention.

In the clay target and shotgun case some of these more common errors are:
 (1) Aiming at the target and not giving any lead.
 (2) Giving the target a lead but stopping swinging the gun at the point of shooting.
 (3) Not having the experience or knowledge to correctly estimate the required lead.
 (4) Not continuing the smooth swing of the gun during the shooting sequence.

This invention will give the shooter the feedback to much more quickly learn what mistakes they are making and allow more rapid correction and the development of a more accurate shooting technique.

Traditionally shooters have spent considerable amounts of time and money on efforts to establish techniques that allows successful aiming of shooting devices. By giving the shooter the feedback in image form they will more quickly become proficient with the shooting device. The present invention is directed to that end.

SUMMARY OF THE INVENTION

Accordingly, the present invention is directed, in part, to a system and method for the capture and review of the target lead, sight picture, impact picture, shooting technique, and aiming accuracy images of a shooting scenario comprising:
 (a) a video recording system that captures or displays:
  (1) a recording of the time prior to shooting device discharge; and
  (2) a recording of the time around the shooting device discharge; and
  (3) a recording of the time after shooting device discharge;
 (b) optionally displaying selected reticules or indicators which represent key points in space and time such as the projectiles predicted hit zone and points of aim;

The present invention is additionally directed, in part, to processes for correction of shooting errors, comprising:
(1) Aiming at the target and not giving any lead.
(2) Giving the target a lead but stopping swinging the shooting device at the point of shooting.
(3) Not having the experience or knowledge to correctly estimate the required lead.

(4) Not having the experience or knowledge to correctly establish the appropriate sight picture at the decision to shoot time.
(5) Not continuing the smooth movement of the shooting device during the shooting sequence, also known as correctly following through.
(6) Errors in the mounting techniques, or head positioning, or head movement in the case a camera field of view is towards the shooter.

BRIEF DESCRIPTION OF THE DRAWINGS

FIG. 1 is a pictorial representation of the present invention on various potential shooting devices.

FIG. 2 shows block diagrams of some embodiments of the invention.

FIG. 3 is a flowchart illustrating an example of a data collection and recording method in accordance with the present invention.

FIG. 4 shows a pictorial representation of a possible video and still frame data sequence during playback and potential images being shown on a display device.

FIG. 5 shows a table illustrating some reticle options to match the shooting scenario and projectile performance.

FIG. 8 shows a pictorial representation of some of the mounting options and designs that can be employed with the present invention.

FIG. 9 is an illustration of an example of data collection and data entry to allow the computation and correction of an offset between the camera point of aim and the shooting device point of aim.

FIG. 10 shows a pictorial representation of an example of memory management during recording of images and data.

FIG. 11 shows two sketches of aim point reticules at the time the shooter decides to shoot. These pictures are from prior to the target being hit which was approximately 64 mille-seconds later.

FIG. 12 is an illustration of adding an optional point of strike reticle to represent the point in space that the projectile will travel towards. In this example the point of strike reticle maintains its position relative to the background and not the moving camera device.

DETAILED DESCRIPTION OF ILLUSTRATIVE EMBODIMENTS

Figure 6:
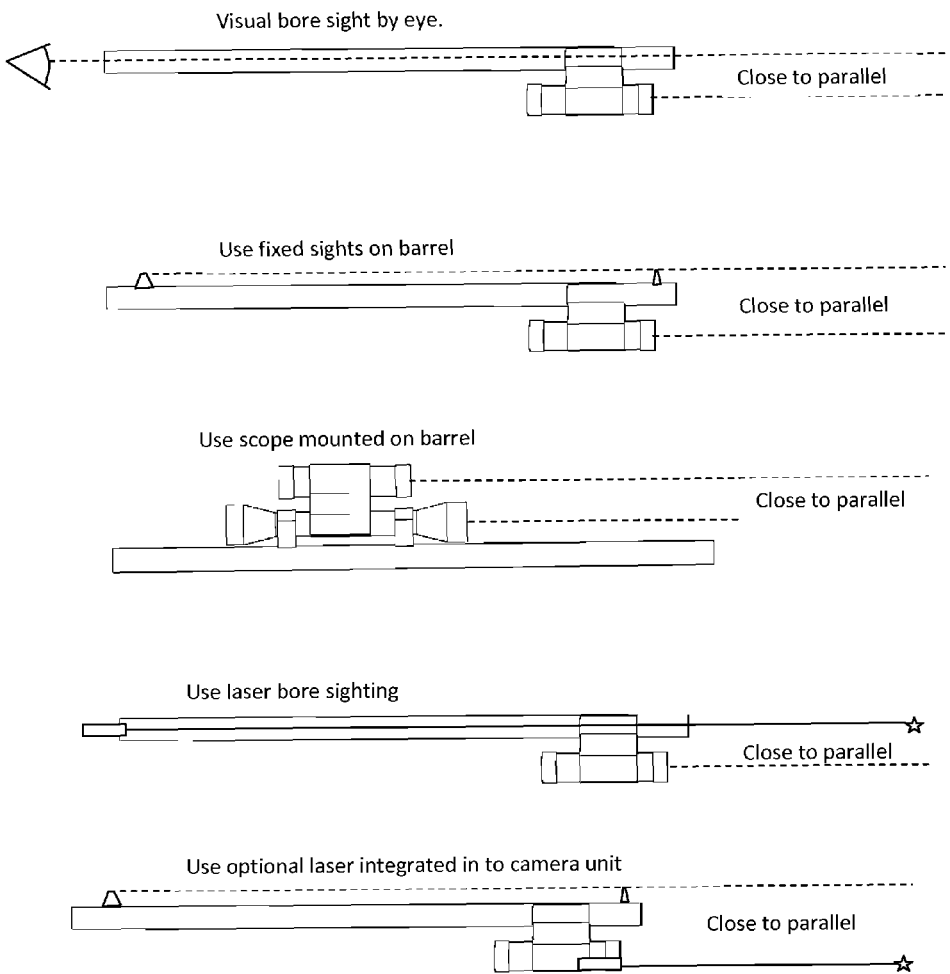
FIG. 6 shows a pictorial representation of some of the techniques that can be used to align the camera, and/or camera reticle, with the shooting device aim point.

The present invention is generally directed to the process for the capture of video, slow motion, still images, sight picture, impact picture, and target lead data. More particularly, the present invention relates to processes, capable of giving the shooter the visual representation of the target, or the shooter, or both, of successful and unsuccessful shots at a moving or stationery target, in an ergonomically efficient and economical manner.

Some advantages of the methods of the present invention include, in certain embodiments, the ability to judge the amount of target lead that the shooter uses and the effectiveness of that amount of target lead; the ability to identify and correct errors in shooting techniques; the ability to capture the sight picture and impact picture; and the ability to match both the shooting device and the shooters performance to the target characteristics.

As employed above and throughout the disclosure, the following terms, unless otherwise indicated, shall be understood to have the following meanings The "sight picture" is the image that the shooter sees at the time they take the decision to shoot and is the image the shooter sees showing the relationship between the shooting device sighting system, the point being aimed at, and the target.

The "impact picture" is the image at the point the projectile strikes an object in the target zone.

The examples provided in the definitions present in this application are non-inclusive unless otherwise stated. They include but are not limited to the recited examples.

As used herein, the term "shooting device" includes all equipment designed to launch projectiles at a target area.

As used herein, the term "reticule" comprises: the visual representation of the point of aim and/or strike zone, and can include the characteristics of the projectile, or projectiles, including the spread of the strike zone, allowances for variations in projectile strike zone location, allowances for human reaction time and variations, and correction of variations between perceived image and actual image.

It is believed the names used herein correctly and accurately reflect the underlying components, and process equipment. However, the nature and value of the present invention does not depend upon the theoretical correctness of these, in whole or in part. Thus it is understood that the names attributed to the correspondingly indicated components, and process equipment are not intended to limit the invention in any way.

Accordingly, in one embodiment, the present invention is a camera device comprising:
  (a) a camera mounted on sum shooting device; and
  (b) the camera is not dependant on the shooting device targeting system; and
  (c) an alignment system that allows the aim point reticule or camera aim point to be approximately aligned to, and/or calibrated to, the aim point of the shooting device; and
  (d) a reticule and/or indicator generating system to add a reticule, or graticule, or indicator, to indicate aim point of the camera and/or shooting device; and
  (e) an internal or external discharge sensor and/or trigger that senses the discharge of the shooting device.

The camera device provides for the capture and preparation of images and data, comprising:
  (a) a video stream comprising:
    (1) a recording of the time prior to shooting device discharge; and
    (2) a recording of the time around shooting device discharge; and
    (3) a recording of the time after shooting device discharge;
  (b) optionally repeating step (a) with still images, or slow motion, added at selectable points in time; and
  (c) optionally repeating step (a) and, or, (b) with reticules, or graticule, added to indicate sight picture, aim point, strike point, impact picture, and characteristics of projectile, or projectiles;
  (d) displaying the recorded data in either real time, or at a later time, using an internal or external display device via a data link (wired or wireless) or memory device; and
  (e) methods and systems for mounting the hardware on various shooting devices; and (f) optionally repeating step (a) with the camera facing towards the shooter to record the images of the shooter, and, or the shooting device.

(g) optionally repeating step (a) with camera having a bi-directional recording option having fields of view both towards the shooter and towards the target.

In some preferred embodiments, a laser provides alignment capabilities to align the camera aim point with the shooting device aim point.

In certain preferred embodiments, the aim point of the camera may be mechanically adjusted to reduce offset from the aim point of the shooting device.

In certain preferred embodiments, the offset data between the aim point of the camera and the aim point of the shooting device may be determined automatically, or by the shooter using optical or laser alignment techniques. The points of aim offset can be compensated for by using the offset data in the camera device to allow the point of aim reticule to be approximately matched to the point of aim of the shooting device.

In certain preferred embodiments, the camera may be mounted facing back towards the shooter. This allows the technique of the shooter during the mounting, discharging, and follow-through of the shooting device to be recorded. The camera may be mounted facing back towards the shooter in any position on the shooting device and will be determined by the desired images and the left or right handedness of the shooter.

In certain preferred embodiments, the camera may have a Field Of View (FOV) both towards the shooter and towards the target. This allows the technique of the shooter during the mounting, discharging, and follow-through of the shooting device to be simultaneously recorded with the target images. The bi-directional camera may be mounted in any position that the user determines will have suitable FOV's.

In certain more preferred embodiments the discharge sensor shall be an accelerometer, vibration sensor, microphone, muzzle flash sensor, optical sensor, or mechanical or electrical switching mechanism.

In certain embodiments the camera device will have a gravitational sensor that will be utilized to orientate the output images with gravity downwards in the images. This enables the playback images to be independent of camera orientation during recording. If for example a gun mounted camera device was transitioned from lying on its side to the normal shooting orientation the output images would always show the bottom of the image towards the earth, i.e. down on the image would be in line with gravitational pull. This same effect can optionally be achieved through signal processing of the background image to ensure the visual horizon is maintained as horizontal in the displayed images.

A pictorial representation of the invention is shown in FIG. 1. These illustrations are not meant to limit the invention in any way. The camera device 101, sometimes abbreviated to camera 101, is shown in FIG. 1 in several possible configurations. With a handgun 103 a typical configuration would be mounted on a mounting rail 102 which are a common accessory on pistol handguns. In the case of revolvers the mounting rails are less common and the mounting hardware is more likely to be similar to that used on a long gun 105.

With the long gun 105, or any other shooting device, the camera can be mounted in any orientation which does not inhibit the particular objective of the shooter. For example, if the objective of the shooter is to video themselves during the use of the shooting device, then mounting the camera in an orientation that inhibited some of the functionality of the shooting device, would be an option that the shooter may select. In a more typical case, the camera 101, would be mounted on the barrel of a long gun 105 and be as least obtrusive to the target picture of the shooter as possible. In the case of a shotgun that may be under the barrel of the gun using mounting hardware 104 to secure the camera 101 and prevent damage to the gun barrel. With a rifle there may be a scope 108 fitted to the long gun and that can offer the possibility of mounting the camera alongside the scope. The pictorial of the bow shows the camera 101 mounted on the bow riser 106. The bow riser 106 is the area that includes the grip of the bow and is often designed to take accessories such as sights and stabilizers which in turn can be part of the mounting system of the camera 101. The bow stabilizer mounting hole in the riser often uses a standard thread size and the option of using the camera 101 as a stabilizer, or enhancement to the stabilizer is envisaged. The camera 101 could be moved toward or away from the riser 106 to create different moments of force to allow the camera 101 to effectively become a customizable stabilizer weight at a custom distance from the riser 106. The typical mounting points on a crossbow would be alongside a scope 108 or underneath the crossbow, perhaps in association with another accessory.

In FIG. 2 the block diagram shows the camera optical sensor unit 201 with a lens having field of view 202 inside the housing 203. The other blocks depict the micro processor/signal processor, 204, the on board memory 205, the power source 206, and the discharge sensor 207. The power source 206 can be a battery, rechargeable battery, or external power supply, or any combination thereof. The discharge sensor 207 can be an accelerometer (or inertia sensor), a microphone, a vibration sensor, an optical sensor, or a combination thereof. The discharge sensor 207 also has the ability to be overridden by an external device which is used to sense the discharge of the shooting device, or activated by the trigger release mechanism of the shooting device. An optional laser 208, is shown. The laser 208, could be utilized as a targeting device, but more probably as an aid to align the point of aim of the camera with the point of aim of the shooting device. The lens of the camera can be shrouded with a lens protector 209 to aid in reducing reflections and improving concealment. The camera unit has the option of using an anti-reflection device comprising a lattice of material which reduces light reflections from light at an angle wider than the camera field of view. Also shown are illustrations of mechanical point of aim adjustment and bi-directional recording option.

In FIG. 3 a simplified flowchart shows one approach to the recording methodology. When the device is powered on and in recording mode the available memory in the "over-writable" memory, or buffer memory, is written to until it is required to overwrite the oldest data with the newest data. This loop continues until an interrupt is received from the discharge sensor. The interrupt can be generated from either the integrated discharge sensor or some external device generating an interrupt. When an interrupt is received the recorded data from a pre-set time prior to the interrupt, the current data being received, and the video data from a pre-set time after the interrupt is collectively flagged as discharge N. This discharge N data is identified as not to be overwritten until specified by the user and would typically be written to non-volatile storage memory. The user would typically only erase the discharge N data after the user has downloaded the data and chosen to delete the recorded discharges.

In the event another discharge interrupt N+1 is received during the pre-set time that interrupt N is being recorded then the continuity of the video stream would be maintained until a complete post interrupt interval time had passed. i.e. second, third, etc, shooting events would be recorded together until a pre-set period free of shooting events had passed.

The data stored as a result of the sensing of a discharge could include, but not be limited to, the video data, the reticule (point of aim) data, point of impact data, date & time, projectile data, user specified data, and discharge sensor data. It is also an option to modify the camera setting on receipt of a discharge sensor interrupt. For example, recording frame rate, zoom level, and resolution settings could be modified for some period of time after each interrupt is received. It is also an option to have a light source partially controlled by the discharge sensor interrupts.

FIG. 4 shows an example of data playback. In this example the user has transferred data on a memory device, or has downloaded the data, to a playback device and has optionally configured the playback data to be displayed in two separate run sequences with run 2 automatically following run 1. The run 1 video shows the video images around the time of discharge. This allows the user to see the continuous sequence with or without the point of aim reticule. Run 2 breaks the video stream down to a sequence comprising:
1. Pre-discharge video
2. In this example a still picture (frame) shortly before discharge which is calculated to be the sight picture of the shooter at the time the decision to shoot was made. In the case of a moving target, this shows the perceived lead given to the target.
3. A still picture (frame) that equates to the time the projectile has travelled 20 yards based on the user selected projectile data. In this example it shows shotgun pellets impacting a clay target.
4. A still picture (frame) that equates to the time the projectile has travelled 60 yards based on the user selected projectile data. In this example it shows the clay target fragments.
5. Post-discharge video The example given would allow the shooter to see the correct swing and position of the reticule to achieve a target strike. If the target was missed it would allow the shooter to analyze why it was missed. Additionally, slow motion can be used during the shooting sequence.

FIG. 5 shows some of the almost limitless reticule options and some of the probable applications that would be used for the different reticules. Using the shotgun example, the user can input or select options that will align the characteristics of the reticule with those of the ammunition selected. The shot pattern is dependent on the material (e.g. lead versus steel shot), the shot velocity, the choke constriction of the shotgun barrel, shot size, shot hardness, cartridge design, environmental factors, etc., and by selecting a reticule that best represents the shot pattern at the approximate target distance the user will have the reticule that best represents the effective and probable strike zone. The option to customize the reticule allows for a reticule that can show data which corresponds to information that the user will find useful in their shooting scenario.

FIG. 6 gives examples of aligning the shooting device, in this case a gun barrel, with the camera point of aim. Some of the methods of achieving alignment are:
1. Bore sighting by eye similar to bore sighting a rifle scope.
2. Using the open sights on the barrel.
3. Using an already sighted in scope on the barrel.
4. Using a bore sighting laser. The laser is typically either installed in the chamber of the barrel or in the barrel itself. In both cases the laser bore sighter typically has some mechanical adapter to ensure it is aligned down the center of the barrel.

These examples require that the point of aim of the barrel be identified then ensuring that either on a real time display (internal or external to the camera unit), or on later playback of the video, the point of aim of the camera is in approximate alignment.

An option, which may be standard with all cameras if economically viable, is to have an integrated laser, or a detachable laser that comes with the system, and could be used to simplify the alignment of the two points of aim. The laser would have the same approximate point of aim as the camera. In this case the user would turn on the laser and then simply insure that the target sighting system of the shooting device is in approximate alignment with the laser.

Figure 7:
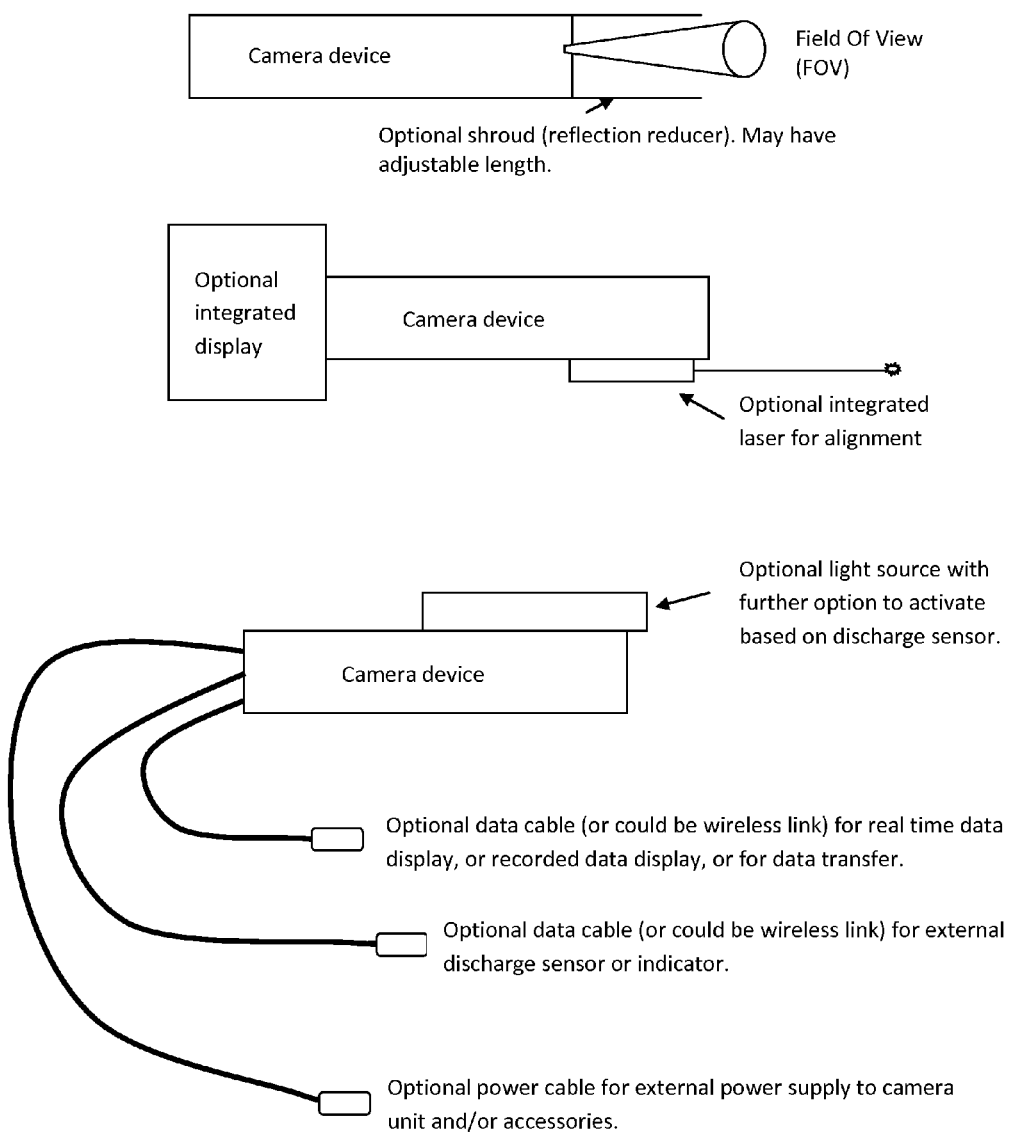
FIG. 7 shows a pictorial representation of some of the features that can be employed to enhance the present invention.

FIG. 7 shows some of the optional features that are available with the camera system. A shroud which may be adjustable in length will allow for improved light conditions at the camera lens and will also reduce the reflections from the lens in the case that concealment is desired. Also shown is the optional alignment laser and it may be integrated into the camera housing, attached as an accessory, or provided by a third party. An optional integrated video display is also shown. The option of attaching a light source is shown and that light source could be controlled by the camera system to optimize lighting and it could also be activated by the discharge sensor. Finally there are some optional data and power links shown:
1. A data link, either hard wired, or wireless, to allow data transfer and display of images in either real-time or previously recorded.
2. A data link, either hard wired, or wireless, to allow data to be input to the camera system from external event triggers or external discharge sensors.
3. An external power supply which could be used to supply the camera system plus any attached accessories or options such as the light source and laser.

The mounting of the camera unit is most simply achieved in the case that a standard Picatinny, Weaver, or equivalent, accessory mounting rail system is on the shooting device. These rail systems are common on, or readily added to, pistols, semi-automatic rifles, bows, and crossbows. These rail systems are less common on revolvers, bolt action rifles, and shotguns. In the case that a rail system is not an option for mounting the camera system then mounting hardware must be provided. FIG. 8 shows examples of shotgun mounts and the same principles for a single barrel shotgun can be applied to most rifles and revolvers. Shotguns have the added complexity that many have double barrels in either an over-and-under (O/U) or side-by-side (SxS) configuration. There are multiple mounting options but the two basic principles shown in FIG. 8 are:
1. Straps to mount the unit with the straps being configured to prevent interruption of the gun sight picture seen by the shooter, or,
2. A clamping system, where the clamps are designed for single, O/U, and SxS barrel configurations.

Where possible, the clamping hardware mounting systems will have the option of facing the camera back towards the shooter to provide the option of recording video of the shooter and shooting device.

The mounting hardware can also ensure correct orientation of video playback as shown in FIG. 8. The shock absorbing pads in this example have ridges that fit into grooves in the camera assembly that locate and retain the camera assembly, and are offset from 180 degrees to ensure that the camera assembly can only be mounted in one vertical orientation in the mounting brackets for correctly orientated video playback.

The barrel size of both handguns and long guns varies considerably. The mounting hardware would be designed to accommodate the various barrel sizes such as 12 and 20 gauge in shotguns; 22, 38 and 45 calibers in handguns; 223, 243, 270, 300, 338 and 416 in rifles, etc, etc.

FIG. 9 shows examples where the offset of the camera point of aim and the shooting device point of aim are compensated/corrected (brought into alignment) for image display and reticule position, by programming a correction into the camera unit or the display unit. In these examples the user measures the difference from the shooting device point of aim, typically using the shooting devices sighting system, and the camera unit point of aim. With laser calibration this can be units of measure, such as inches, or with graticule calibration it can be graticule units, or divisions. In the examples a user sets a target to a known distance (10 yards in this case) then measures or calculates the offset in inches in the laser calibration example (6 inches right and 8 inches low) and pixel equivalents in the graticule calibration (60 pixels right and 80 pixels low based on of 720×1280 recoding, or alternatively dividing the screen into divisions it could be 8 divisions low and 6 divisions to the right of the target spot). The offset amount can be determined using the optional laser or can be calculated from a calibration reticule, or grid, overlay on the camera unit's video images. The offset data is then processed by the camera unit, or the display unit, to allow the display images and point of aim reticule to have the point of aim of both the camera unit and the shooting device be brought into reasonably close alignment. In both cases this allows the camera reticule, representing the camera point of aim, to be calibrated and brought in to alignment with the shooting device point of aim. For example, after calibration the calibrated camera reticule will approximately appear to be at the target point when the shooting device's integral sights indicate it is pointing at the target.

FIG. 10 shows a pictorial representation of a memory management scheme utilized during recording. It shows a block diagram which has a block to represent the SDRAM or FLASH memory which may be used. It depicts the SDRAM or FLASH being utilized in a recording loop and the discharge event data being designated not for overwrite.

FIG. 11 shows two sketches where two different reticules are used to represent the aim point. The first sketch shows a circle to indicate the strike zone of #9 pellets through a skeet choke at a typical skeet target distance. The second sketch uses a mil-dot, or calibrated reticule with the gap between each "dot", or calibration line, representing a known distance at a known range. These early experiments were to help define the invention. In these sketches of video frames taken at the time we see an early version of the sight picture showing the relative positions of the point of aim of the camera, the point of aim of the gun, and the target. These sketches are based on pictures taken at Markham Park Skeet Range on Mar. 10, 2011 and the frame counter was used to calculate the time between shotgun discharge and impact of the shot on the clay target. The 14 frames represent approximately 64 mille-seconds at the frame rate used. The calculated distance between shotgun and the clay target at impact is approximately 25 yards based on the shot travelling at 1200 fps. This matches the distance observed at the time of the shooting.

FIG. 12 shows a reticule or point of aim indicator generating system wherein the point of aim reticule and/or indicator can be referenced to the shooting device prior to the shooters decision to shoot and referenced to the image data at some point after the shooters decision to shoot. The image processing capability allows the reticule and/or indicator to transition to being fixed in space relative to the background image or image reference point. This allows the display of one or two reticules and/or indicators. The first continues to indicate the position of the point of aim of the shooting device; the second indicates the point in space where the projectile is anticipated to travel towards. In the case of a skeet shooter, the point of aim reticule and/or indicator can be displayed on the images and then at/or after the point in time the shooter decides to shoot a second reticule and/or indicator is added to the image but is no longer representing the point of aim of the shooting device, instead this second reticule and/or indicator represents the point in space that the projectile is traveling towards.

EXAMPLES

Example 1

A user is consistently missing clay targets at a skeet range, upon examining the video and still images provided by the invention the shooter identifies that they are consistently not giving the target enough lead to hit the clays. This scenario could also be applied where the shooter was consistently high, low, or in front of the clay target.

Example 2

A user is consistently missing clay targets at a skeet range, upon examining the video and still images provided by the invention the shooter identifies that they are consistently stopping the gun at the point of firing which will typically result in a missed clay. This scenario could also be applied where the shooter was swinging too fast, or inconsistently.

Example 3

A user is consistently missing clay targets at a trap range. The camera is mounted to record the shooter and upon examining the video and still images provided by the invention the shooter identifies that they are consistently lifting their head from the stock of the gun at the point of firing which will typically result in a missed clay. This scenario could also be applied where the shooter was mounting the gun incorrectly.

Example 4

A user is consistently missing targets at an archery range. Upon examining the video and still images provided by the invention the shooter identifies that they are consistently twisting the bow off vertical at the point of releasing the arrow which will typically result in a poor shot. This scenario could also be applied where the archer was not allowing enough drop or lead with the target.

Example 5

A user is consistently missing targets at a competitive shooting competition. Upon examining the video and still images provided by the invention the shooter identifies that they are consistently misaligning the point of aim of the handgun or rifle to the right of the target as they squeeze the trigger.

Example 6

At a law enforcement training center the instructor is having difficulty explaining the sight picture that the student should be looking for in order to correctly identify a correct sight picture for various scenarios. This invention allows the student to observe the video and images from both his shooting scenario's, and those of the instructors, to learn from the instructor and correct his mistakes to better emulate the appropriate sight picture at the critical decision to shoot time.

When ranges are used herein for physical properties, such as time or distance, all combinations and sub-combinations of ranges and specific embodiments therein are intended to be included.

The disclosures of each patent, patent application and publication cited or described in this document are hereby incorporated herein by reference, in their entirety.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

Embodiment 1

A camera device comprising:
(a) a camera mounted on sum shooting device; and
(b) the camera is not dependant on the shooting device targeting system; and
(c) an alignment system that allows the aim point reticule or camera aim point to be approximately aligned to, and/or calibrated to, the aim point of the shooting device; and
(d) a reticule and/or indicator generating system to add a reticule, or graticule, or indicator, to indicate aim point of the camera and/or shooting device; and
(e) an internal or external discharge sensor and/or trigger that senses the discharge of the shooting device.

The camera device provides for the capture and preparation of images and data, comprising:
(a) a video stream comprising:
  (1) a recording of the time prior to shooting device discharge; and
  (2) a recording of the time around shooting device discharge; and
  (3) a recording of the time after shooting device discharge;
(b) optionally repeating step (a) with still images, sight picture, impact picture, or slow motion, added at selectable points in time; and
(c) optionally repeating step (a) and, or, (b) with reticules, or graticule, added to indicate aim point, strike point, and characteristics of projectile, or projectiles;
(d) displaying the recorded data in either real time, or at a later time, using an internal or external display device via a data link (wired or wireless) or memory device; and
(e) methods and systems for mounting the hardware on various shooting devices; and
(f) optionally repeating step (a) with the camera facing towards the shooter to record the images of the shooter, and, or the shooting device.
(g) optionally repeating step (a) with camera having a bi-directional recording option having fields of view both towards the shooter and towards the target.

Embodiment 2

The camera device according to Embodiment 1, but without an internal or external discharge sensor and/or trigger that senses the discharge of the shooting device.

Embodiment 3

The camera device according to Embodiment 1, but without a reticule and/or indicator generating system to add a reticule, or graticule, or indicator, to indicate aim point of the camera and/or shooting device.

Embodiment 4

The camera device according to Embodiment 1, wherein the camera device is mounted on a shooting devices as described in FIG. 1.

Embodiment 5

The camera device according to Embodiment 1, wherein the camera device overwrites memory while in a recording loop but retains the data associated with a shooting device discharge as described in FIGS. 3 and 10.

Embodiment 6

The camera device according to Embodiment 1, wherein the camera device can display shooting device discharge data as described in FIG. 4.

Embodiment 7

The camera device according to Embodiment 1, wherein the camera device can display reticules, or graticule, corresponding to the point of aim and strike point as described in FIGS. 5, 11, and 12.

Embodiment 8

The camera device according to Embodiment 1, wherein the camera device point of aim can be aligned with the shooting device point of aim as described in FIG. 6.

Embodiment 9

The camera device according to Embodiment 1, wherein the camera device point of aim can be aligned with the shooting device point of aim using a laser which is either integrated into the camera device or an attachable accessory. The laser point of aim is aligned with the camera point of aim which in turn allows the alignment of the shooting device point of aim.

Embodiment 10

The camera device according to Embodiment 1, wherein the camera device has optional features described in FIG. 7.

Embodiment 11

The camera device according to Embodiment 1, wherein the camera device has optional mounting hardware as described in FIG. 8.

Embodiment 12

The camera device according to Embodiment 1, wherein the camera device has optional laser, or camera generated graticule or other optical alignment capability that allow for the offset of the camera point of aim and the shooting device point of aim to be reduced and compensated for (brought into alignment) for image display by generating a correction factor (or calibration amount) used by the camera unit or the display unit. The generated offset data is processed by the camera unit, or the display unit, to allow the display images to have the point of aim of both the camera unit and the shooting device brought into reasonably close alignment as described in FIG. 9.

Embodiment 13

The camera device according to Embodiment 1, wherein the camera device can display multiple reticules, or graticules, corresponding to the point of aim and strike point or path of projectile as described in FIG. 12.

Embodiment 14

The camera device according to Embodiment 1, wherein the camera device has system of recording a video stream comprising distinct times:
(1) a recording of a time prior to shooting device discharge in the range of 0 to 10 seconds; and
(2) a recording of a time around shooting device discharge in the range of 0 to 5 seconds; and
(3) a recording of a time after shooting device discharge in the range of 0 to 20 seconds; and

Embodiment 15

The camera device according to Embodiment 1, wherein the camera device has system of recording a video stream comprising distinct times:
(1) a recording of a time prior to shooting device discharge in the range of 0 to 60 seconds; and
(2) a recording of a time around shooting device discharge in the range of 0 to 60 seconds; and
(3) a recording of a time after shooting device discharge in the range of 0 to 60 seconds; and

Embodiment 16

The camera device according to Embodiment 1, wherein the camera device has system of recording a video stream comprising distinct times:
(1) a recording of a time prior to shooting device discharge in the range of 0 to the maximum time allowed by available memory; and
(2) a recording of a time around shooting device discharge in the range of 0 to the maximum time allowed by available memory; and
(3) a recording of a time after shooting device discharge in the range of 0 to the maximum time allowed by available memory.

Embodiment 17

The camera device according to Embodiment 1, wherein the camera device records the video with still images or slow motion added at selectable points in time.

Embodiment 18

The camera device according to Embodiment 1, wherein the camera device records the video with still images or slow motion added at the point in time that is calculated to be the point in time where the shooter decided to discharge the shooting device, commonly referred to as the sight picture.

Embodiment 19

The camera device according to Embodiment 1, wherein the camera device records the video with still images or slow motion added at the point in time that is calculated to be the point in time where the shooter pulled the trigger, or discharged, the shooting device.

Embodiment 20

The camera device according to Embodiment 1, wherein the camera device has a reticle and/or indicator generating system to add a reticule, or graticule, or indicator, to indicate aim point of the camera and/or shooting device.

Embodiment 21

The camera device according to Embodiment 1, wherein the camera device has a reticle and/or indicator generating system to add a reticule, or graticule, or indicator, to indicate aim point of the camera and/or shooting device with reference to the targeted object and enabling the shooter to estimate the lead given to a moving target.

Embodiment 22

The camera device according to Embodiment 1, wherein the camera device has a reticle and/or indicator generating system to add a reticule, or graticule, or indicator, to indicate aim point of the camera and/or shooting device where the reticule and/or indicator generating system is independent and separate from the sighting system or targeting scope of the shooting device.

Embodiment 23

The camera device according to Embodiment 1, wherein the camera device overwrites memory while in a recording loop but retains the data associated with a shooting device discharge. The memory would be saved, flagged, or designated not to be overwritten, when it contained the data associated with a shooting device discharge. This would result in two "virtual" areas of memory. The first area for continuous overwrite with newest data and the second identified as not to be overwritten.

Embodiment 24

The camera device according to Embodiment 1, wherein the camera device can display shooting device discharge data that allows the analysis of target lead and/or shooting technique. The shooting device discharge data and associated images could allow for the shooter to calculate the lead given to a moving target in both the case where the target was hit and where the target was missed.

Embodiment 25

The camera device according to Embodiment 1, wherein the camera device can display shooting device discharge data that allows the analysis of the sight picture, target lead, or shooting technique. The shooting device discharge data and associated images could allow for the shooter to calculate the shooting device alignment relative to a target in both the case where the target was correctly aimed at and where the target was incorrectly aimed at.

Embodiment 26

The camera device according to Embodiment 1, wherein the camera device can display a reticule, or graticule, or indicator, which is in approximate alignment with the shooting device point of aim.

Embodiment 27

The camera device according to Embodiment 1, wherein the camera device point of aim can be aligned with the shooting device point of aim utilizing optical alignment techniques. Optical alignment techniques include, but are not limited to, bore sighting, using shooting devices fixed sights, using shooting device scope, using a camera generated graticule or overlay. The optical alignment techniques allow the user to reference and calibrate the camera point of aim and shooting device point of aim.

Embodiment 28

The camera device according to Embodiment 1, wherein the camera device point of aim can be aligned with the shooting device point of aim utilizing laser alignment techniques, or a combination of laser and optical alignment techniques. Laser alignment techniques include, but are not limited to, laser bore sighting, using a laser integral to the camera device, using a laser external to the camera device. The laser alignment techniques allow the user to reference and calibrate the camera point of aim and shooting device point of aim.

Embodiment 29

The camera device according to Embodiment 1, wherein the camera device has a fixed or adjustable lens shroud to control light into the lens and/or prevent damage to the lens.

Embodiment 30

The camera device according to Embodiment 1, wherein the camera device has an integrated laser for alignment and/or calibration of the point of aim indicator and/or reticule generating system.

Embodiment 31

The camera device according to Embodiment 1, wherein the camera device has a light, or infrared, source for field of view illumination, which may be controlled by the discharge sensor.

Embodiment 32

The camera device according to Embodiment 1, wherein the camera device has a wired or wireless link to transmit image data to an external device.

Embodiment 33

The camera device according to Embodiment 1, wherein the camera device has a wired or wireless link to transmit discharge data to an external device.

Embodiment 34

The camera device according to Embodiment 1, wherein the camera device has a connection to an external power supply.

Embodiment 35

The camera device according to Embodiment 1, wherein the camera device has optional mounting hardware allowing the camera device to be mounted on a shooting device such as a shotgun, pistol, revolver, rifle, bow, or crossbow, in any orientation that allows the shooter to capture shooting event data both towards the target and towards the shooter.

Embodiment 36

The camera device according to Embodiment 1, wherein the camera device is bi-directional and has two separate image sensors, allowing the recording or display of the field of view towards the target and the field of view towards the shooter and/or shooting device.

Embodiment 37

The camera device according to Embodiment 1, wherein the camera device can display shooting device discharge data that allows the analysis of shooting technique. The shooting device discharge data and associated images could allow for the shooter to see the shooting technique, such as shooters head position, eye position, arm position, body position and body movement, in the shooting scenario.

Embodiment 38

The camera device according to Embodiment 1, wherein the camera device has an internal discharge sensor comprising an accelerometer.

Embodiment 39

The camera device according to Embodiment 1, wherein the camera device has an internal discharge sensor comprising a vibration sensor.

Embodiment 40

The camera device according to Embodiment 1, wherein the camera device has an internal discharge sensor comprising a microphone.

Embodiment 41

The camera device according to Embodiment 1, wherein the camera device has an internal discharge sensor comprising a muzzle flash sensor.

Embodiment 42

The camera device according to Embodiment 1, wherein the camera device has an internal discharge sensor comprising an optical sensor.

Embodiment 43

The camera device according to Embodiment 1, wherein the camera device has an internal discharge sensor comprising a mechanical mechanism attached to the shooting device trigger mechanism.

Embodiment 44

The camera device according to Embodiment 1, wherein the camera device has an internal discharge sensor comprising an electrical switching mechanism connected to the shooting device trigger mechanism.

Embodiment 45

The camera device according to Embodiment 1, wherein the camera device has an external discharge sensor comprising an accelerometer.

Embodiment 46

The camera device according to Embodiment 1, wherein the camera device has an external discharge sensor comprising a vibration sensor.

Embodiment 47

The camera device according to Embodiment 1, wherein the camera device has an external discharge sensor comprising a microphone.

Embodiment 48

The camera device according to Embodiment 1, wherein the camera device has an external discharge sensor comprising a muzzle flash sensor.

Embodiment 49

The camera device according to Embodiment 1, wherein the camera device has an external discharge sensor comprising an optical sensor.

Embodiment 50

The camera device according to Embodiment 1, wherein the camera device has an external discharge sensor comprising a mechanical mechanism attached to the shooting device trigger mechanism.

Embodiment 51

The camera device according to Embodiment 1, wherein the camera device has an external discharge sensor comprising an electrical switching mechanism connected to the shooting device trigger mechanism.

Embodiment 52

The camera device according to Embodiment 1, wherein the camera device has an anti-reflection device comprising a lattice of material which reduces light reflections from light at an angle wider than the camera field of view.

Embodiment 53

The camera device according to Embodiment 1, wherein the camera device has an integrated display allowing the viewing of real time or recorded images and video.

Embodiment 54

The camera device according to Embodiment 1, wherein the camera device has an external display allowing the viewing of real time or recorded images and video.

Embodiment 55

The camera device according to Embodiment 1, wherein the camera device has an orientation sensor allowing the camera device to record images where the bottom of the image is downwards in alignment with gravitational pull. In the case where the camera is on its side the display images would be similar to as if the camera was in a more normal gravity downwards orientation.

Embodiment 56

The camera device according to Embodiment 1, wherein the camera device has the image processing capability to allow the camera device to record images where the image horizon is maintained approximately horizontal. In the case where the camera is on its side the display images of an outdoor scene would be similar to as if the camera was in a more normal gravity downwards orientation with the outdoor scene having an approximately horizontal horizon.

Embodiment 57

The camera device according to Embodiment 1, wherein the point of aim reticule is variable in design to allow for the reticule to represent the characteristics of the projectile or projectiles. These characteristics include, but are not limited to, the spread of multiple projectiles, the drop of a projectile, the strike zone of projectiles, and the flight path errors of projectiles. In the case of a shotgun the shooter can select a reticule or indicator that represents the projectile characteristics of the shotgun. A skeet shooter could select a choke setting of Improved Cylinder (IC). A trap shooter could select a choke setting of Full (F). In the case of a bow the shooter could select an arrow speed of 300 fps. In the case of a rifle the shooter could select a bullet weight of 150 grains.

Embodiment 58

The camera device according to Embodiment 1, wherein the point of aim reticule and/or indicator can be referenced to the shooting device prior to the shooters decision to shoot and referenced to the image data at some point after the shooters decision to shoot. The image processing capability allows the reticule and/or indicator to transition to being fixed in space relative to the background image or image reference point. This allows the display of one, or two, or multiple reticules, and/or indicators. The first continues to indicate the position of the point of aim of the shooting device; the second indicates the point in space where the projectile is anticipated to travel towards. In the case of a skeet shooter, the point of aim reticule and/or indicator can be displayed on the images and then at/or after the point in time the shooter decides to shoot a second reticle and/or indicator is added to the image but is no longer representing the point of aim of the shooting device, instead this second reticle and/or indicator represents the point in space that the projectile is traveling towards.

Embodiment 59

The camera device according to Embodiment 1, wherein the camera device has a focal length which matches the distance at which the target is expected to be struck with the projectile. This focal length can be pre-programmed, or selected by the user, and prevents the camera device from focusing on the background or foreground images.

Embodiment 60

The camera device according to Embodiment 1, wherein the camera device is mounted on a bow as described in FIG. 1. The camera can be moved toward or away from the riser to create different moments of force to allow the camera to become a customizable stabilizer weight at a variable distance from the riser.

Embodiment 61

The camera device according to Embodiment 1, wherein the camera device goes into a low power sleep mode after a selectable time and is woken up by either a bump, a shake, closing the action of a double barrel shotgun, closing the action of a semi-automatic long gun, pumping the action of a long gun, or some other operation that can be sensed to wake up the camera prior to the shooting device being discharged.

Embodiment 62

The camera device according to Embodiment 1, wherein the camera device has mounting hardware that ensures correct orientation of video playback as described in FIG. 8. The shock absorbing pads in this example have ridges that fit into grooves in the camera assembly that locate and retain the camera assembly, and are offset from 180 degrees to ensure that the camera assembly can only be mounted in one vertical orientation in the mounting brackets for correctly orientated video playback.

What is claimed:

1. A camera device comprising:
   a camera mounted on a shooting device to capture video discharge data of the shooting device associated with at least one of a sight picture, a target lead, and a shooting technique, the camera is independent of a targeting system of the shooting device, and the video discharge data allows a shooter to estimate a lead given to a target in both a case where the target was hit and where the target was missed, and also to estimate a shooting device alignment relative to a target in both the case where the target was correctly aimed at and where the target was incorrectly aimed at;
   at least one of
      a reticule generating system to add a reticule in a field of view towards a discharge end of the shooting device, and
      an indicator generating system to add a graticule in the field of view towards the discharge end of the shooting device, to indicate an aim point of the camera; and
   an alignment system to adjust a position of the aim point of the camera relative to the aim point of the shooting device.

2. The camera device according to claim 1, wherein the camera device has system of recording a video stream in a range of 0 to a maximum time allowed by available memory during one or more of:
   a time prior to shooting device discharge;
   a time around shooting device discharge; and
   a time after shooting device discharge.

3. The camera device according to claim 1, wherein the camera records a video with at least one of still images and slow motion at selectable points in time, the selectable points in time include one or more of:
   a sight image point in time when a trigger of the shooting device is about to be activated;
   a discharge image point in time when the shooting device is discharged; and
   an image point in time when a projectile impacts a target.

4. The camera device according to claim 1, wherein the at least one of the reticule generating system and the indicator generating system enables a video Iomega capture of a lead given to a moving target.

5. The camera device according to claim 1, further comprising:
   a first area of memory for continuous overwrite with newest data while in a recording loop; and
   a second area of memory second identified as write-protected associated with a discharge of the shooting device.

6. The camera device according to claim 1, wherein the shooting device is at least one
   a shotgun,
   a pistol,
   a revolver,
   a rifle,
   a bow, and
   a crossbow.

7. The camera device according to claim 1, wherein the aim point of the camera is aligned with the aim point of the shooting device using at least one of
   optical alignment with one or more of an optical bore sighting, a shooting device's fixed sight, a scope mounted on the shooting device, the graticule generated by the indicator generating system; and
   laser alignment with one or more of laser bore sighting, a laser integral to the camera device, a laser separate from the camera device.

8. The camera device according to claim 1, further comprising:
   an integrated laser for adjustment of the aim point of the camera relative to the aim point of the shooting device.

9. The camera device according to claim 1, further comprising:
   a light source for field of view illumination which is activated by a discharge sensor.

10. The camera device according to claim 1, wherein the camera further includes a first image sensor and a second image sensor; and;
   a mount for holding the camera on the shooting device with the first image sensor positioned to capture a field of view towards a discharge end of the shooting device and the second image sensor positioned to capture a field of view towards a shooter using the shooting device.

11. The camera device according to claim 1, further comprising
   a discharge sensor, the discharge sensor is at least one of:

an accelerometer;
a vibration sensor;
a microphone;
a muzzle flash sensor;
an optical sensor;
a mechanical mechanism coupled to a trigger mechanism of the shooting device; and
an electrical switching mechanism coupled to a trigger mechanism of the shooting device.

12. The camera device according to claim 1, further comprising:
at least one of
an orientation sensor to orient a capture of images, and
an image processor to orient captured images,
independent of a rotation of the camera with respect to a horizon in which the earth surface and the sky appear to meet.

13. The camera device according to claim 1, wherein the reticule generating system generates a plurality of different reticules to represent a plurality of different projectile characteristics including one or more of
a type of the projectile;
a spread of projectiles;
a drop of the projectile;
a strike zone of the projectile;
a flight path error of the projectile;
a weight of the projectile; and
a speed of the projectile.

14. The camera device according to claim 1, further comprising:
an image processor programmed to transition the indicator to be fixed in space relative to an image reference point, thereby providing images of
a first indicator to indicate a position of the aim point the shooting device, and
a second indicator to indicate the point in space where a projectile is anticipated to travel towards, whereby a second indicator is added to the video after the discharge of the shooting device.

15. The camera device according to claim 1, wherein the camera includes an adjustable focal length to match a distance at which the target is expected to be struck with a projectile.

16. The camera device according to claim 1, wherein the shooting device is a bow with a riser, and the mount is slidably mounted on the bow at different distances away from the riser to act as a customizable stabilizer.

17. The camera device according to claim 1, wherein the camera goes into a low power sleep mode after a selectable time and is woken up by at least one of:
a bump;
a shake;
a closing action of a gun;
a closing action of a semi-automatic long gun; and
a pumping action of a gun.

18. The camera device according to claim 1, wherein the mount includes ridges for orienting the camera in only one orientation with respect to the shooting device.

19. A camera device comprising:
a camera with a mount for mounting on a shooting device;
a generating system to create an indicator of an aim point of the shooting device on an image being captured by the camera prior to shooting device discharge and referenced to image data at some point after shooting device discharge
an image processor programmed to transition the indicator to be fixed in space relative to an image reference point, thereby providing a display of
a first indicator to indicate a position of the aim point the shooting device, and
a second indicator to indicate the point in space where a projectile is anticipated to travel towards, whereby the second indicator is added to the image after a discharge of the shooting device.

20. A point of aim compensation and correction system comprising:
a camera device mounted on a shooting device for capturing an image;
at least one of
an optical alignment mechanism includes one or more of an optical bore sighting, a shooting device's fixed sight, a scope mounted on the shooting device, a generated indicator, and a generated overlay, and
a laser alignment mechanism with one or more of laser bore sighting, a laser integral to the camera device, a laser separate from the camera device, to adjust and offset an aim point indicator of the camera device and an aim point of the shooting device by programming a correction offset data into the camera device; and
wherein the offset data is processed by the camera device to align the aim point of the camera to the aim point of the shooting device.

* * * * *